United States Patent
Lo et al.

(10) Patent No.: US 11,513,375 B2
(45) Date of Patent: Nov. 29, 2022

(54) SILICON THERMAL-OPTIC PHASE SHIFTER WITH IMPROVED OPTICAL PERFORMANCE

(71) Applicant: Cisco Technology, Inc., San Jose, CA (US)

(72) Inventors: Ming Gai Stanley Lo, Breinigsville, PA (US); Vipulkumar K. Patel, Breinigsville, PA (US); Mark A. Webster, Bethlehem, PA (US); Prakash B. Gothoskar, Allentown, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/716,139

(22) Filed: Dec. 16, 2019

(65) Prior Publication Data
US 2021/0181543 A1    Jun. 17, 2021

(51) Int. Cl.
| | |
|---|---|
| *G02F 1/01* | (2006.01) |
| *G02F 1/025* | (2006.01) |
| *G02F 1/225* | (2006.01) |
| *G02B 6/12* | (2006.01) |

(52) U.S. Cl.
CPC ............ *G02F 1/0147* (2013.01); *G02F 1/025* (2013.01); *G02F 1/2257* (2013.01); *G02B 2006/12142* (2013.01); *G02F 2203/50* (2013.01)

(58) Field of Classification Search
CPC ...... G02F 1/0147; G02F 1/025; G02F 1/2257; G02F 2203/50; G02B 2006/12142
USPC ........................................................ 385/1–3
See application file for complete search history.

(56) References Cited

U.S. PATENT DOCUMENTS

| | | | | |
|---|---|---|---|---|
| 6,093,334 | A | * | 7/2000 | Suzuki ................... G02F 1/011 216/24 |
| 9,654,061 | B2 | | 5/2017 | Lakshmikumar et al. |
| 10,394,059 | B1 | | 8/2019 | Anderson et al. |
| 2001/0046363 | A1 | * | 11/2001 | Purchase ................ G02F 1/011 385/140 |
| 2002/0126933 | A1 | * | 9/2002 | Goh ................... G02B 6/12007 385/2 |
| 2004/0091195 | A1 | * | 5/2004 | Bischel .................. G02F 1/065 385/4 |

(Continued)

FOREIGN PATENT DOCUMENTS

WO      2007146233 A2   12/2007

OTHER PUBLICATIONS

"Wavelength-tunable silicon microring modulator" by Dong et al, Optics Express, vol. 18, No. 11, pp. 10941-10946, 2010 (Year: 2010).*

(Continued)

*Primary Examiner* — Robert Tavlykaev
(74) *Attorney, Agent, or Firm* — Patterson + Sheridan, LLP

(57) ABSTRACT

A thermo-optic phase shifter comprises an optical waveguide comprising a P-type region comprising a first contact, an N-type region comprising a second contact, and a waveguide region disposed between the P-type region and the N-type region and having a raised portion. The thermo-optic phase shifter further comprises one or more heating elements. The one or more heating elements include one or more discrete resistive heating elements or the P-type and N-type regions driven as resistive heating elements.

7 Claims, 5 Drawing Sheets

(56) References Cited

U.S. PATENT DOCUMENTS

| | | | | |
|---|---|---|---|---|
| 2009/0110342 A1* | 4/2009 | Webster | .................. | G02F 1/025 |
| | | | | 385/2 |
| 2010/0054653 A1* | 3/2010 | Carothers | .............. | G02B 6/136 |
| | | | | 385/1 |
| 2011/0058765 A1* | 3/2011 | Xu | .......................... | G02F 1/025 |
| | | | | 385/2 |
| 2011/0280512 A1* | 11/2011 | Abe | ........................ | G02F 1/377 |
| | | | | 385/14 |
| 2012/0087613 A1* | 4/2012 | Rasras | .................. | G02F 1/0147 |
| | | | | 385/1 |
| 2012/0243828 A1* | 9/2012 | Suzuki | ............... | G02B 6/12007 |
| | | | | 385/32 |
| 2014/0110572 A1* | 4/2014 | Li | .......................... | G02F 1/025 |
| | | | | 250/227.23 |
| 2015/0132015 A1* | 5/2015 | Hayakawa | ............ | G02F 1/0147 |
| | | | | 398/200 |
| 2015/0192803 A1* | 7/2015 | Lee | ....................... | G02F 1/0147 |
| | | | | 385/3 |
| 2016/0266414 A1* | 9/2016 | Gill | ......................... | G02F 1/025 |
| 2018/0188632 A1* | 7/2018 | Celo | ........................ | G02F 1/025 |

OTHER PUBLICATIONS

T. K. Liang, and H. K. Tsang, Role of free carriers from two-photon absorption in Raman amplification in silicon-on-insulator waveguides, Appl. Phys. Lett. 84(15), 2745 (2004). (Abstract Only).

\* cited by examiner

SILICON THERMAL-OPTIC PHASE SHIFTER WITH IMPROVED OPTICAL PERFORMANCE

TECHNICAL FIELD

Embodiments presented in this disclosure generally relate to optical devices, more specifically, embodiments disclosed herein thermo-optic devices.

BACKGROUND

In many photonic applications, optical devices may include a silicon photonic platform. However, when employed in high power applications, silicon photonic platforms suffer reduced optical performance due to free-carrier absorption (FCA) introduced by a two-photon absorption (TPA) effect. Further, in a thermo-optic (TO) phase shifter, the TPA effect also introduces an optical power dependent phase shift. The optical power dependent phase shift may cause sensing control problems within the TO phase shifter. In various implementations, silicon nitride waveguides have been utilized to mitigate optical loss. However, due to a lack of a phase tuning mechanism and low thermal-optic coefficient of a silicon nitride waveguide, silicon nitride based optical tuning devices are inefficient.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure comprises a thermo-optical phase shifter comprising an optical waveguide comprising a P-type region having a first contact, an N-type region having a second contact, and a waveguide region disposed between the P-type region and the N-type region and having a raised portion. The thermo-optical phase shifter further comprises a resistive heating element thermally coupled to the optical waveguide.

One embodiment presented in this disclosure comprises an optical device. The optical device comprises a first thermo-optic phase shifter and a second thermo-optic phase shifter. The first thermo-optic phase shifter comprises an optical waveguide and a first resistive heating element thermally coupled to the optical waveguide. The optical waveguide comprises a P-type region comprising a first contact, an N-type region comprising a second contact, and a waveguide region disposed between the P-type region and the N-type region. The second thermo-optic phase shifter comprises an optical waveguide and a first resistive heating element thermally coupled to the optical waveguide. The optical waveguide comprises a P-type region comprising a first contact, an N-type region comprising a second contact, and a waveguide region disposed between the P-type region and the N-type region.

One embodiment presented in this disclosure comprises a thermo-optical phase shifter comprising an optical waveguide and a power supply. The optical waveguide comprises a P-type region comprising a first contact and a second contact, an N-type region comprising a third contact and a fourth contact, and a waveguide region disposed between the P-type region and the N-type region. The waveguide region has a raised portion. The power supply is configured to drive the first contact with a first voltage and the third contact with a second voltage greater than the first voltage to reverse bias the P-type region and the N-type region.

Example Embodiments

In various embodiments discussed herein, an optical apparatus comprises a thermo-optic (TO) phase shifter having an optical waveguide configured to modulate and propagate an optical signal. In some cases, during operation, a non-linear optical effect called Two Photon Absorption (TPA) occurs within the optical waveguide, increasing optical loss within the optical waveguide. In various implementations, a reversed biased p-i-n diode mitigates the TPA effect, reducing optical loss within the optical waveguide. However, no implementations exist where the p-i-n diode structure is incorporated within the optical waveguide of a TO phase shifter. Accordingly, the following description describes an optical waveguide of a TO phase shifter having a p-i-n diode structure.

Figure 1:
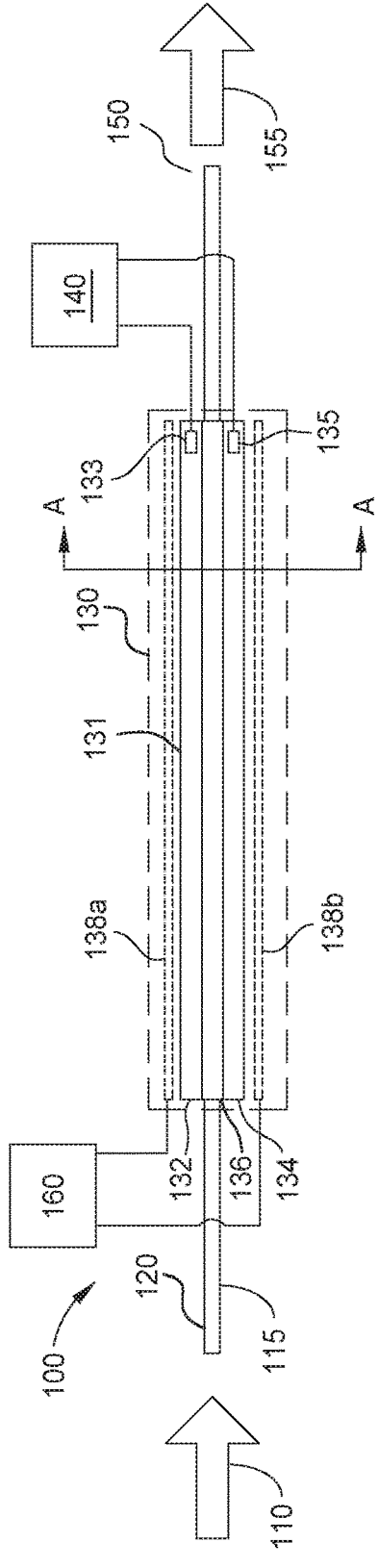
FIGS. 1 and 2 illustrate an optical device, according to one or more embodiments.

FIG. 1 is a diagram of an optical device 100, according to one or more embodiments. The optical device 100 may be implemented in any suitable form, such as an optical switching device. In some embodiments, the optical device 100 comprises a modulator. The optical device 100 includes an input 115 that receives an input optical signal 110. The optical device 100 further comprises an optical waveguide 120 that propagates the first optical signal. The optical device 100 further comprises a TO phase shifter 130 that is arranged proximate to the first optical waveguide 120. The TO phase shifter 130 adjusts a phase of the input optical signal 110 propagating along the optical waveguide 120. In one embodiment, as the input optical signal 110 propagates along the optical waveguide 120, the TO phase shifter 130 is driven to apply a first phase shift to the input optical signal 110.

The TO phase shifter 130 includes a p-i-n diode structure optical waveguide 131. The optical waveguide 131 includes a doped silicon (P-type) region 132, a doped silicon (N-type) region 134, and a waveguide region 136 (an intrinsic silicon region). The waveguide region 136 may be a rib waveguide having a raised region (e.g., raised region 337 of FIG. 3). The raised region may include one or more layers. For example, the rib waveguide may be formed by etching the silicon partially. In another example, the rib waveguide may be formed by depositing silicon and/or other high refractive index dielectric materials. The P-type region 132 includes contact (e.g., electrical contact) 133, and the N-type region 134 includes the contact (e.g., electrical contact) 135. The contacts 133 and 135 are coupled to power supply 140.

The power supply 140 drives the contacts 133 and 135 with voltages that reverse bias the p-i-n junction. For example, the power supply 140 drives the contacts 133 and 135 with different voltages. Further, the power supply 140 may drive the contact 135 with a voltage that is greater than the voltage driven on the contact 133 to reverse bias the p-i-n diode structure. In various embodiments, increasing the difference between the voltage on the contact 135 and the voltage on the contact 133 increases the electric field within p-i-n diode structure, decreasing the carrier lifetime in the intrinsic region. In one or more embodiments, the power supply 140 drives the contact 135 with a voltage in a range of about 0V to about 5V and the contact 133 with a voltage in a range of about 0V to about −1V. However, in other embodiments, voltages of greater than 5V and/or less than −1V are utilized. In one embodiment, the power supply 140 drives the contact 135 with a voltage of about 2.7V and the contact 133 with a voltage of about 0V. Alternatively, or additionally, the power supply 140 may drive the contact 133 with a voltage that is greater than the voltage driven on the contact 135. Further, as will be discussed with regard to the embodiments of FIGS. 6 and 7, the power supply 140 may drive additional contacts coupled to the P-type region 132 and the N-type region 134 to operate the P-type region 132 and the N-type region 134 as heating elements.

In one embodiment, driving the N-type region 134 with a voltage higher than that of the voltage driven on the P-type region 132 reverse biases the p-i-n diode structure and generates a high electric field in an intrinsic region of the optical waveguide 131. Accordingly, electron-hole pairs that are generated by a TPA effect are swept away from the high optical intensity region (e.g., the waveguide region 136), reducing optical loss in the optical device 100.

The TO phase shifter 130 may additionally include one or more of resistive heating elements 138a, 138b. Alternatively, the resistive heating elements 138a, 138b may be omitted and the P-type region 132 and the N-type region 134 may be configured to function as resistive heating elements. Further, in one or more embodiments, the TO phase shifter 130 may include the resistive heating element 138a and omit the resistive heating element 138b. Further, the resistive heating elements 138a and 138b may extend along the optical waveguide 131 and are substantially parallel thereto. Other relative orientations of the resistive heating elements 138a and 138b are also possible. The resistive heating elements 138a and 138b are thermally coupled to the optical waveguide 131. For example, the resistive heating elements 138a and 138b are disposed such that heat generated by the resistive heating elements 138a and 138b is coupled into the optical waveguide 131.

A phase controller 160 may be coupled with the resistive heating elements 138a, 138b. The phase controller 160 may be implemented in any suitable form, such as a microprocessor, a digital signal processor (DSP), an application-specific integrated chip (ASIC), a field programmable gate array (FPGA), logic gates, combinations thereof, and so forth. The phase controller 160 drives the resistive heating elements 138a, 138b, and the current that is carried along the resistive heating elements 138a, 138b. For example, the phase controller 160 supplies a first amount of current to the resistive heating elements 138a, 138b to obtain required phase shift after the TO phase shifter 130. The first amount of current may correspond to the resistivity of the resistive heating elements 138a, 138b and phase tuning efficiency of the TO phase shifter 130.

The optical device 100 outputs output optical signal 155 via output 150. The output optical signal 155 is a modulated version of the input optical signal 110. Modulating the input optical signal 110 comprises one or more of an amplitude attenuation and phase modulation generated by the TO phase shifter 130 and input/output waveguides. The output optical signal 155 may be phase-modulated by the TO phase shifter 130. For example, the output optical signal 155 may be modulated based on the certain phase-shifting current applied to the TO phase shifter 130.

Figure 2:
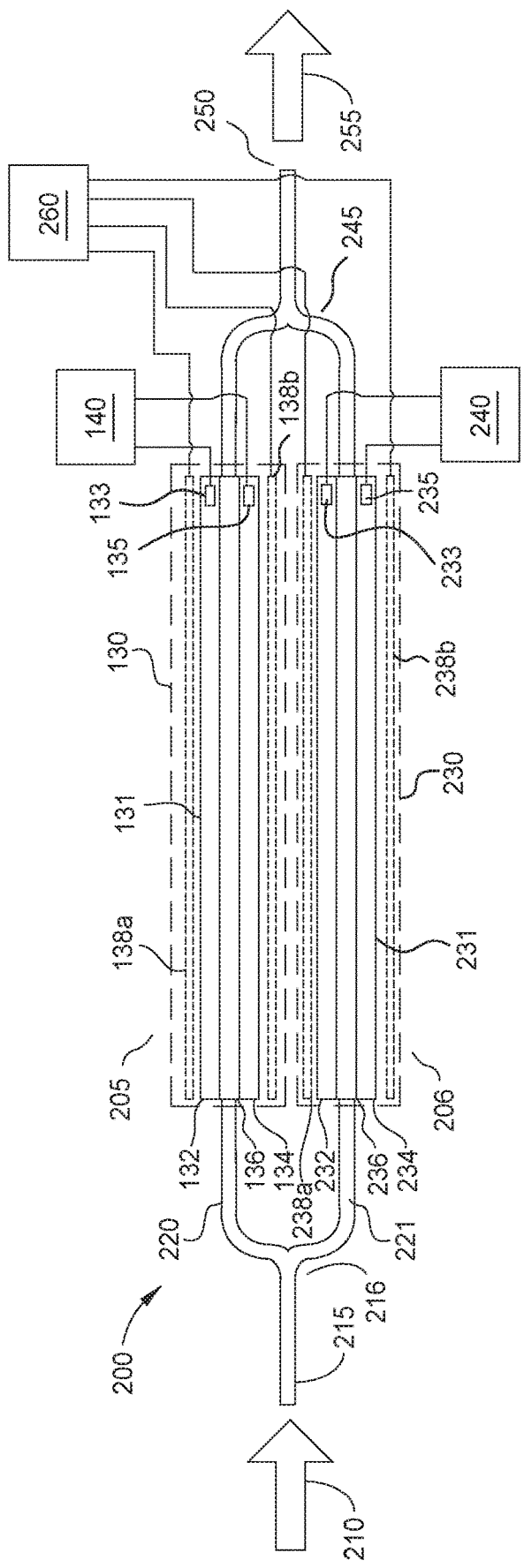

FIG. 2 is a diagram of an optical apparatus 200, according to one or more embodiments. The optical apparatus 200 may be implemented in any suitable form, such as an optical switching device. In some embodiments, the optical apparatus 200 comprises a modulator. The optical apparatus 200 comprises an input 215 that receives an input optical signal 210, and a splitter 216 optically coupled with the input 215. The splitter 216 divides or otherwise distributes the optical power from the input optical signal 210 onto a first arm 205 (as a first optical signal) and onto a second arm 206 (as a second optical signal).

The first arm 205 comprises the first optical waveguide 220 that propagates the first optical signal. The first arm 205 further comprises a TO phase shifter 130 that is arranged proximate to the optical waveguide 220. The TO phase shifter 130 is described above with regard to FIG. 1. Further, the TO phase shifter 130 adjusts the phase of the first optical signal propagated along the first optical waveguide 220.

The second arm 206 comprises a second optical waveguide 221 that propagates the second optical signal. The second arm 206 further comprises a second TO phase shifter 230 that is arranged proximate to the second optical waveguide 221. The TO phase shifter 230 adjusts the phase of the second optical signal propagated along the second optical waveguide 221. In some embodiments, the first TO phase shifter 130 and the second TO phase shifter 230 are substantially parallel to each other.

The TO phase shifter 230 is configured similar to that of the TO phase shifter 130. For example, the TO phase shifter 230 includes an optical waveguide 231, a doped silicon P-type region 232, a doped silicon N-type region 234, and an intrinsic silicon waveguide region 236. The doped silicon P-type region 232 may include contact 233, and the doped silicon N-type region 234 includes the contact 235. The contacts 233 and 235 are coupled to power supply 240. Alternatively, the contacts 233 and 235 may be contacted to the power supply 140 and the power supply 240 may be omitted. In one or more embodiments, the power supply 240 drives the contacts 233 and 235 as the power supply 140 drives the contacts 133 and 135.

The TO phase shifter 230 may additionally include one or more resistive heating elements 238a, 238b. Alternatively, the resistive heating elements 238a, 238b may be omitted and the P-type region 232 and the N-type region 234 may be configured to function as resistive heating elements. Further, in one or more embodiments, the TO phase shifter 230 may include one of the resistive heating elements 238a, 238b, omitting the other resistive heating element.

Further, the resistive heating elements 238a and 238b may extend along the optical waveguide 231 and are substantially parallel thereto. Other relative orientations of the resistive heating elements 238a and 238b are also possible.

A phase controller 260 is coupled with the resistive heating elements 138a, 138b, 238a, and 238b. The phase controller 260 is configured similar to that of the phase controller 160. The phase controller 160 drives the resistive heating elements 138a, 138b, 238a, and 238b and the current that is carried along the resistive heating elements 138a, 138b, 238a, and 238b responsive to the driving controls the heating applied to the first optical waveguide 220 and/or the second optical waveguide 221.

The optical apparatus 200 further comprises a combiner 245 that is optically coupled with the first optical waveguide 220 and the second optical waveguide 221. The combiner 245 combines the optical power of the first optical signal and the second optical signal, which may be phase-modulated by the TO phase shifters 130, 230, onto an output 250. An output optical signal 255 is output from the output 250. Thus, the output optical signal 255 is intensity modulated based on the phase-shifting applied along the first arm 205 and the second arm 206.

Figure 3:
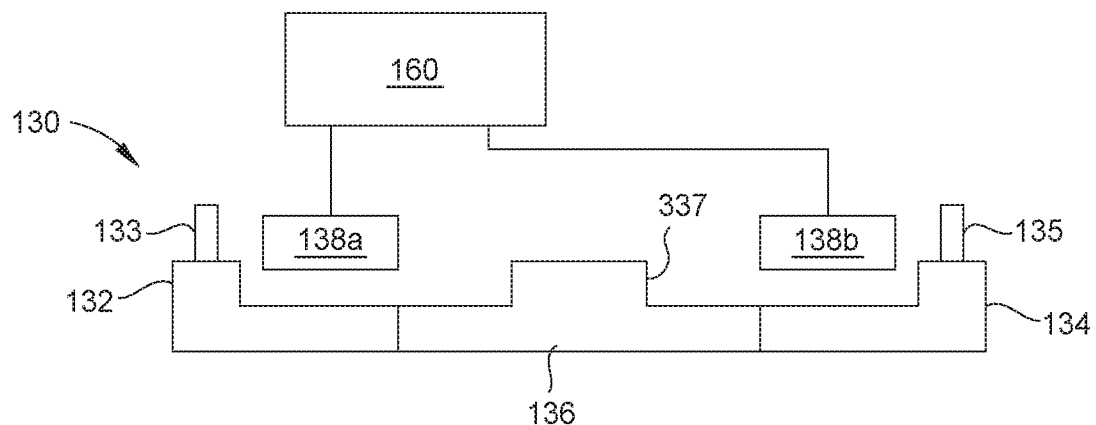
FIGS. 3, 4, 5, 6, 7, 8, and 9 illustrate a thermo-optic phase shifter, according to one or more embodiments.

FIG. 3 illustrates cross-sectional view A-A of a TO phase shifter 130, according to one or more embodiments. As is described with regard to FIG. 1, the TO phase shifter 130 includes a doped silicon P-type region 132, a doped silicon N-type region 134, and an intrinsic silicon waveguide region 136. The waveguide region 136 functions as an optical waveguide, guiding the optical field into the core region. Further, the waveguide region 136 includes a raised region 337. The raised region 337 may include one or more layers. The waveguide region 136 carries the optical signal within the TO phase shifter 130. For example, the raised region 337 may carrier the optical signal within the TO phase shifter 130.

A contact 133 is formed on the P-type region 132 and a contact 135 is formed on the N-type region 134. The contacts 133 and 135 are driven with a power supply, e.g., the power supply 140, such that the N-type region 134 is driven to a voltage greater than the P-type region 132, reverse biasing the P-type region 132 and the N-type region 134. Reverse biasing the P-type region 132 and the N-type region 134 sweeps free carriers out of the raised region 337 of waveguide region 136 in the P-type region 132 and N-type region 134. Further, the P-type region 132, the N-type region 134 and the waveguide region 136 may be formed in a common layer of a semiconductor.

The TO phase shifter 130 further includes resistive heating elements 138a and 138b. The resistive heating elements 138a and 138b may be resistive heaters. For example, the resistive heating elements 138a and 138b may be formed from silicon, poly-silicon, and tungsten, among others. In one embodiment, the resistive heating elements 138a and 138b may be formed of a doped semiconductor material. The resistive heating elements 138a and 138b are disposed in a layer different from that of the P-type region 132, the N-type region 134 and the waveguide region 136. In one embodiment, the resistive heating elements 138a and 138b are disposed in a layer that is above the P-type region 132, the N-type region 134 and the waveguide region 136. A distance between the resistive heating elements 138a and 138b and the waveguide region 136 may be in a range of about 600 nm and 2 um.

The resistive heating elements 138a and 138b are coupled to a phase controller 160. The phase controller 160 is configured similar to that of the phase controllers 160 and 260. Further, the phase controller 160 drives the resistive heating elements 138a, 138b to generate current that is carried along the resistive heating elements 138a, 138b and controls the heating applied to the waveguide region 136.

Figure 4:
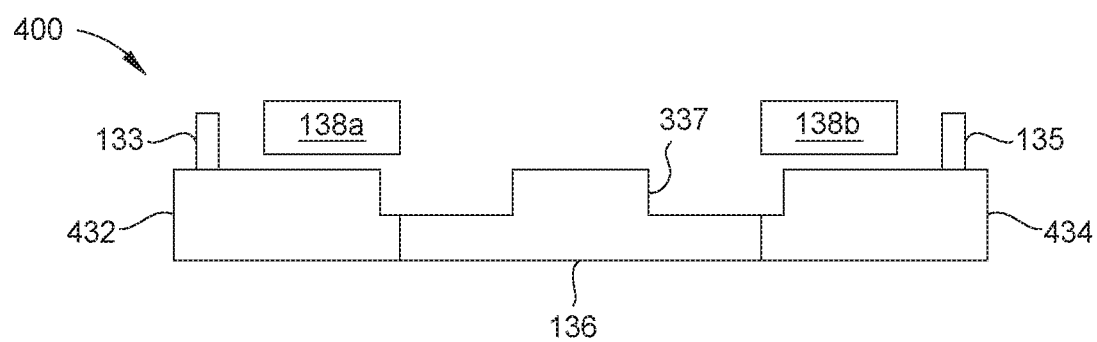

FIG. 4 illustrates a cross-sectional view of a TO phase shifter 400, according to one or more embodiments. The TO phase shifter 400 is configured similar to that of the TO phase shifter 130 of FIG. 3. However, as illustrated in FIG. 4, the P-type region 432 and the N-type region 434 have been extended such that the resistive heating elements 138a and 138b overlap at least a portion the P-type region 432 and N-type region 434. The TO phase shifter 400 enhances the thermal conductivity between the resistive heating elements 138a and 138b and waveguide region 136, resulting in a faster transient response as compared to embodiments where P-type and N-type regions have not been extended.

Figure 5:
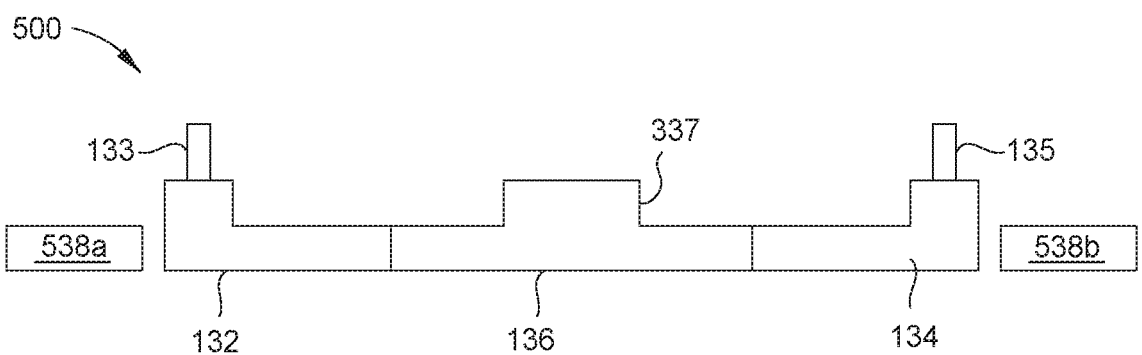

FIG. 5 illustrates a cross-sectional view of TO phase shifter 500, according to one or more embodiments. The TO phase shifter 500 is configured similar to that of the TO phase shifter 130 of FIG. 3. However, as illustrated in FIG. 5, the resistive heating elements 538a and 538b are disposed proximate the P-type region 132 and the N-type region 134, respectively. For example, the resistive heating elements 538a and 538b are disposed in a common layer with the P-type region 132 and the N-type region 134, respectively. Additionally, the resistive heating elements 538a and 538b are disposed parallel to the P-type region 132 and the N-type region 134, respectively.

The resistive heating elements 538a and 538b may be resistive heaters. For example, the resistive heating elements 538a and 538b may be formed from silicon, poly-silicon, and tungsten, among others. In one embodiment, the resistive heating elements 538a and 538b may be formed of a doped semiconductor material. The resistive heating elements 538a and 538b may be formed from the same material as the P-type region 132, waveguide region 136, and the N-type region 134. Accordingly, the resistive heating elements 538a and 538b, and the P-type region 132, waveguide region 136, and the N-type region 134 may be formed or patterned during a common processing step.

The resistive heating elements 538a and 538b are coupled to a phase controller (e.g., the phase controller 160 and 260). The resistive heating elements 538a and 538b are driven by the phase controller such that the current that is carried along the resistive heating elements 538a, 538b generates heat which thermally coupled to the waveguide region 136.

Figure 6:
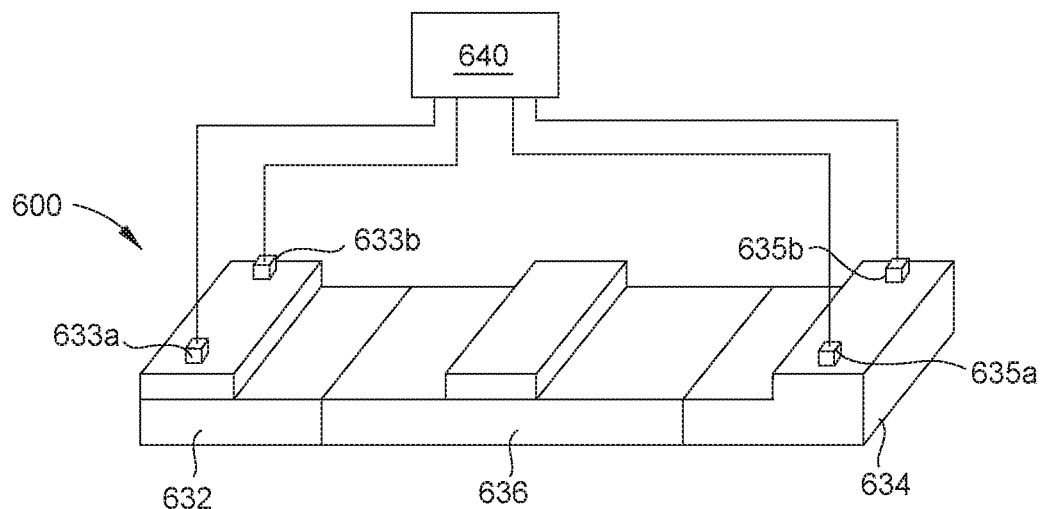

FIG. 6 illustrates a TO phase shifter 600, according to one or more embodiments. The TO phase shifter 600 is configured similar to that of the TO phase shifter 130 of FIG. 3. However, in the embodiment of FIG. 6, the P-type region 632 and the N-type region 634 are configured to function as heating elements as well as being driven in a reversed bias mode to sweep away generated free carriers. The P-type region 632 includes contacts 633a and 633b and the N-type region 634 includes contacts 635a and 635b. Further, the contacts 633a, 633b, 635a and 635b are coupled to a power supply 640.

The power supply 640 drives the P-type region 632 and the N-type region 634 via the contacts 633a and 633b and the contacts 635a and 635b, respectively. For example, the power supply 640 drives the contacts 633a and 633b with a voltage less than that driven on the contacts 635a and 635b to reverse bias the p-i-n structure of the optical waveguide and sweep away generated free carriers from the silicon region 636. The voltage driven on the contacts 635a and 635b may be in a range of about 1V to about 5.0V and the voltage driven on the contacts 633a and 633b may be in a range of about 0V to about 1.0V. However, in other embodiments, voltages of greater than about 5.0V and less than about 0V may be utilized.

Further, the power supply 640 drives the P-type region 632 and the N-type region 634 such that the P-type region 632 and the N-type region 634 function as heating elements. For example, the power supply 640 may drive the contact 633a with a voltage greater than that driven on the contact 633b and drive a voltage on the contact 635a greater than that driven on the contact 635b. Accordingly, a current flow is generated within the P-type region 632 and the N-type region 634 between the pairs of contacts 633a and 633b, and 635a and 635b. The voltage driven on the contact 633a may be equal to or less than the voltage on the contact 635a. Further, the voltage driven on the contact 633b may be equal to or less than the voltage on the contact 635b. The voltages driven on contacts 633a and 635a may be in a range of about 1V to about 5V and the voltage driven on the contacts 633b and 635b may be in a range of about 0V to about 1.0 V. However, in other embodiments, voltages greater than about 5V and less than about 0V may be utilized. In various embodiments, the power supply 640 drives the P-type region 632 and the N-type region 634 in a reverse biased mode when the power supply 640 is not driving the P-type region 632 and N-type region 634 as heating elements. For example, the power supply 640 may drive the P-type region 632 and the N-type region 634 in a reverse biased mode when TO phase shifter 600 is not modulating an input optical signal.

In one embodiment, the power supply 640 drives the P-type region 632 and the N-type region 634 such that the P-type region 632 and the N-type region 634 function as heating elements and are reversed biased. For example, the power supply 640 may drive the contact 633a with a voltage greater than that driven on the contact 633b and drive the contact 635a with a voltage greater than that driven on the contact 633a and the contact 635b. Further, the voltage driven on the contact 635b is greater than that driven on the contact 633b.

Figure 7:
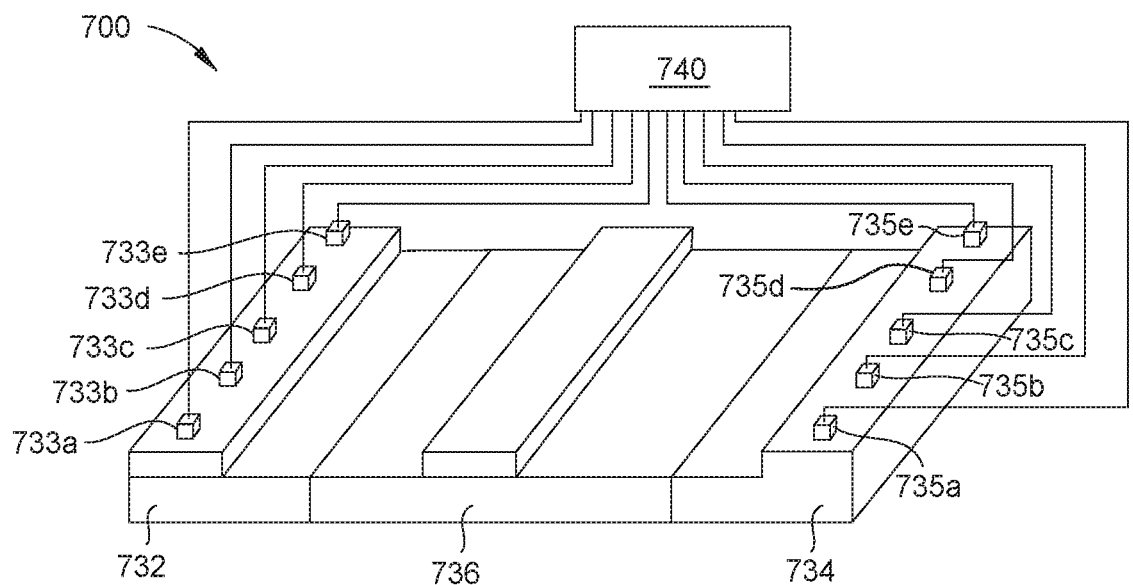

FIG. 7 illustrates a TO phase shifter 700, according to one or more embodiments. The TO phase shifter 700 is configured similar to that of the TO phase shifter 600 of FIG. 6. However, in the embodiment of FIG. 7, the P-type region 732 and the N-type region 734 each include five contacts. In other embodiments, the P-type region 732 and the N-type region 734 include three or more contacts. As illustrated, the P-type region 732 includes contacts 733a, 733b, 733c, 733d, and 733e and the N-type region 734 includes contacts 735a, 735b, 735c, 735d, and 735e. Further, the contacts 733a, 733b, 733c, 733d, and 733e, and 735a, 735b, 735c, 735d, and 735e are coupled to a power supply 740.

The power supply 740 is configured similar to that of the power supply 640. Further, the power supply 740 drives the P-type region 732 and the N-type region 734 via the contacts 733a, 733b, 733c, 733d, and 733e, and 735a, 735b, 735c, 735d, and 735e, respectively. For example, the power supply 740 drives the contacts 733a, 733b, 733c, 733d, and 733e with a first voltage and the contacts 735a, 735b, 735c, 735d, and 735e with a second voltage greater than the first voltage to reverse bias the optical waveguide of the TO phase shifter 700 and to sweep away generated free-carriers from the silicon region 736.

Further, the power supply 740 drives the P-type region 732 and the N-type region 734 such that the P-type region 732 and the N-type region 734 function as heating elements. For example, the power supply 740 may drive the contacts 733a, 733c, and 733e with a voltage greater than that driven on the contacts 733b and 733d such that current flows within the P-type region 732 and the P-type region 732 functions as a resistive heating element. Further, the power supply 740 drives the contacts 735a, 735c, and 735e with a voltage greater than that driven on contacts 735b and 735d such that current flows within the N-type region 734 and the N-type region 734 functions as a resistive heating element. The voltage driven on the contacts 733a, 733c, and 733e may be less than or equal to the voltage driven on contacts 735a, 735c, and 735e. Further, the voltage driven on the contacts 733b and 733d may be less than or equal to the voltage driven on contacts 735b and 735d.

In another embodiment, the power supply 740 may drive the contacts 733a, 733c, and 733e with a voltage that is greater than that driven on the contacts 733b and 733d and less than the voltage driven on the contacts 735a, 735c, and 735e. Further, the voltage driven on the contacts 735a, 735c, and 735e is greater than the voltage driven on the contacts 735b and 735d. Additionally, the voltage driven on the contacts 735b and 735d is greater than the voltage driven on the contacts 733b and 733d. In such an embodiment, the P-type region 732 and the N-type region 734 function as heating elements and are reversed biased.

Figure 8:
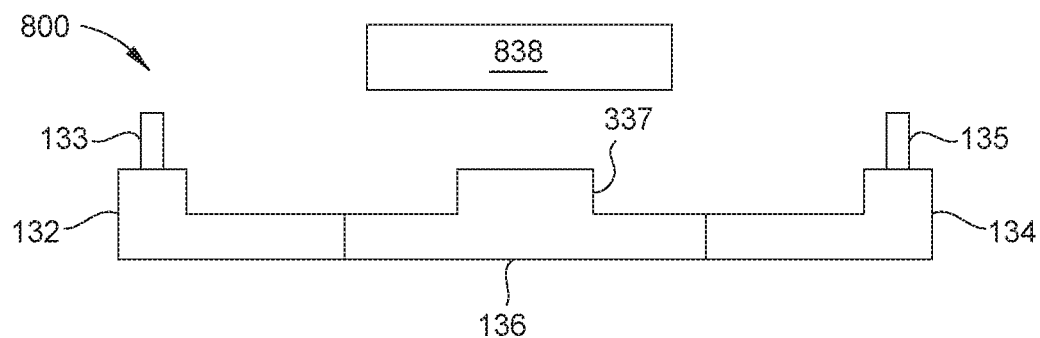

FIG. 8 illustrates a cross-sectional view of TO phase shifter 800, according to one or more embodiments. The TO phase shifter 800 is configured similar to that of the TO phase shifter 130 of FIG. 3. For example, the TO phase shifter 800 includes the P-type region 132, the N-type region 134, and the waveguide region 136. Further, the TO phase shifter 800 includes the resistive heating element 838. The resistive heating element 838 may be a resistive heater. For example, the resistive heating element 838 may be formed from silicon, poly-silicon, and tungsten, among others. In one embodiment, the resistive heating element 838 may be formed of a doped semiconductor material. The resistive heating element 838 is disposed in a layer of a semiconductor different from that of the P-type region 132, the N-type region 134 and the waveguide region 136. In one embodiment, the resistive heating element 838 is disposed in a layer of a semiconductor that is above the P-type region 132, the N-type region 134 and the waveguide region 136. A distance between the resistive heating element 838 and the waveguide region 136 may be in a range of about 600 nm to about 4 um. However, in other embodiments, distances of less than 600 nm or greater than 4 um may be utilized.

The resistive heating element 838 is coupled to a phase controller (e.g., the phase controller 160). The resistive heating element 838 is driven by the phase controller 160 to generate heat which is thermally coupled to the waveguide region 136.

Figure 9:
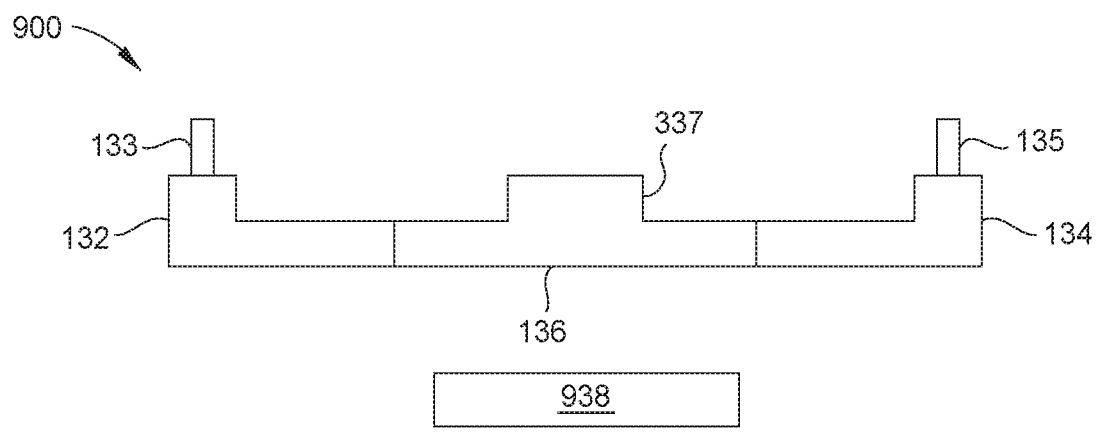

FIG. 9 illustrates a cross-sectional view of TO phase shifter 900, according to one or more embodiments. The TO phase shifter 900 is configured similar to that of the TO phase shifter 800 of FIG. 8. For example, the TO phase shifter 900 includes the P-type region 132, the N-type region 134, and the waveguide region 136. Further, the TO phase shifter 900 includes the resistive heating element 938. The resistive heating element 938 may be a resistive heater. For example, the resistive heating element 938 may be formed from silicon, poly-silicon, and tungsten, among others. In one embodiment, the resistive heating element 938 may be formed of a doped semiconductor material. The resistive heating element 938 is disposed in a layer of a semiconductor different from that of the P-type region 132, the N-type region 134 and the waveguide region 136. In one embodiment, the resistive heating element 938 is disposed in a layer of a semiconductor that is below the P-type region 132, the N-type region 134 and the waveguide region 136. A distance between the resistive heating element 938 and the waveguide region 136 may be in a range of about 600 nm to about 4 um. However, in other embodiments, distances of less than 600 nm or greater than 4 um may be utilized.

The resistive heating element 938 is coupled to a phase controller (e.g., the phase controller 160). The resistive heating element 938 is driven by the phase controller 160 to generate heat that is thermally coupled to the waveguide region 136.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A thermo-optic phase shifter, comprising:
an optical waveguide comprising:
a P-type region comprising:
a first contact configured to be driven with a first direct current (DC) voltage;
a second contact configured to be driven with a second DC voltage,
wherein the first DC voltage is greater than the second DC voltage; and
a third contact configured to be driven with the first DC voltage, wherein the second contact is disposed between the first contact and the third contact;
an N-type region comprising:
a fourth contact configured to be driven with a third DC voltage, wherein the third DC voltage is greater than the first DC voltage;
a fifth contact configured to be driven with a fourth DC voltage, wherein the third DC voltage is greater than the fourth DC voltage, and the fourth DC voltage is greater than the second DC voltage; and a sixth contact configured to be driven with the third DC voltage, wherein the fifth contact is disposed between the fourth contact and the sixth contact; and a waveguide region disposed between the P-type region and the N-type region, the waveguide region having a raised portion; and a power supply configured to reverse bias the P-type region and the N-type region and operate the P-type region and the N-type region as heaters by applying the first DC voltage, the second DC voltage, the third DC voltage, and the fourth DC voltage to the first contact, the second contact, the third contact, the fourth contact, the fifth contact, and the sixth contact.

2. The thermo-optic phase shifter of claim 1, wherein the power supply is further configured to drive the first contact with a fifth DC voltage and the second contact with a sixth DC voltage, wherein the fifth DC voltage is greater than the sixth DC voltage.

3. The thermo-optic phase shifter of claim 2, wherein the power supply is further configured to drive the third contact with a seventh DC voltage and the fourth contact with an eighth DC voltage, wherein the seventh DC voltage is greater than the eighth DC voltage.

4. The thermo-optic phase shifter of claim 3, wherein the fifth DC voltage is equal the seventh DC voltage and the sixth DC voltage is equal to the eighth DC voltage.

5. The thermo-optic phase shifter of claim 1, wherein the first contact is adjacent to the second contact, and the second contact is adjacent to the third contact.

6. The thermo-optic phase shifter of claim 5, wherein the fourth contact is adjacent to the fifth contact, and the fifth contact is adjacent to the sixth contact.

7. The thermo-optic phase shifter of claim 1, wherein the first contact is aligned with the fourth contact, the second contact is aligned with the fifth contact, and the third contact is aligned with the sixth contact.

* * * * *